UNITED STATES PATENT OFFICE.

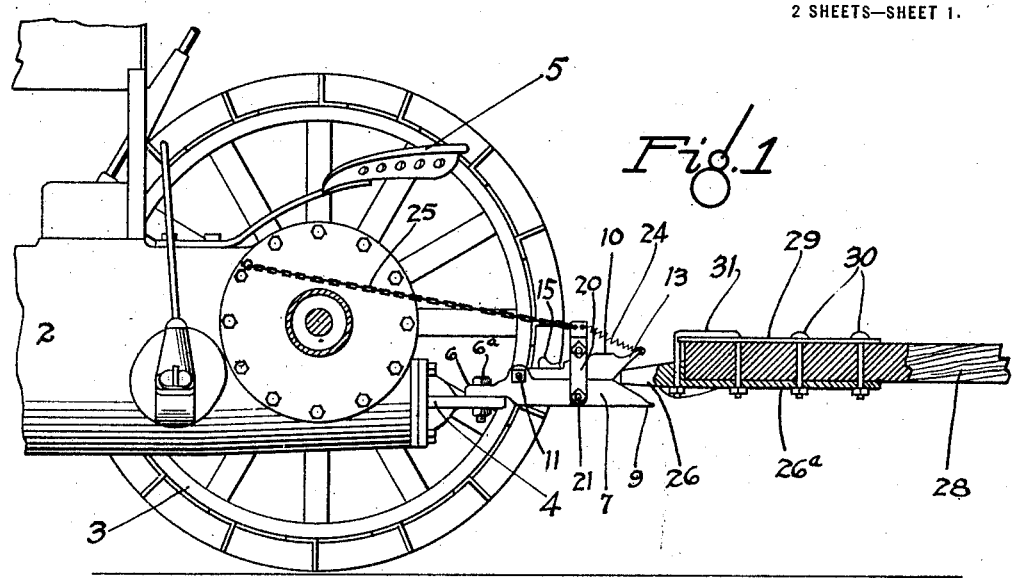
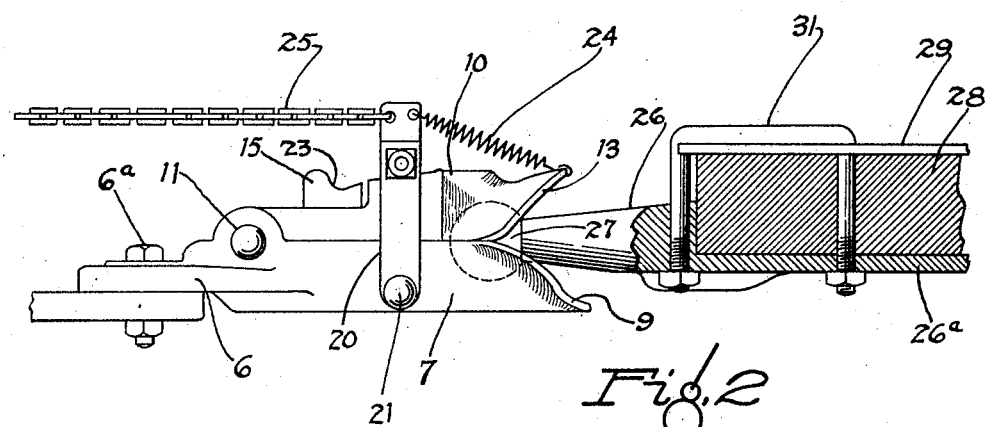
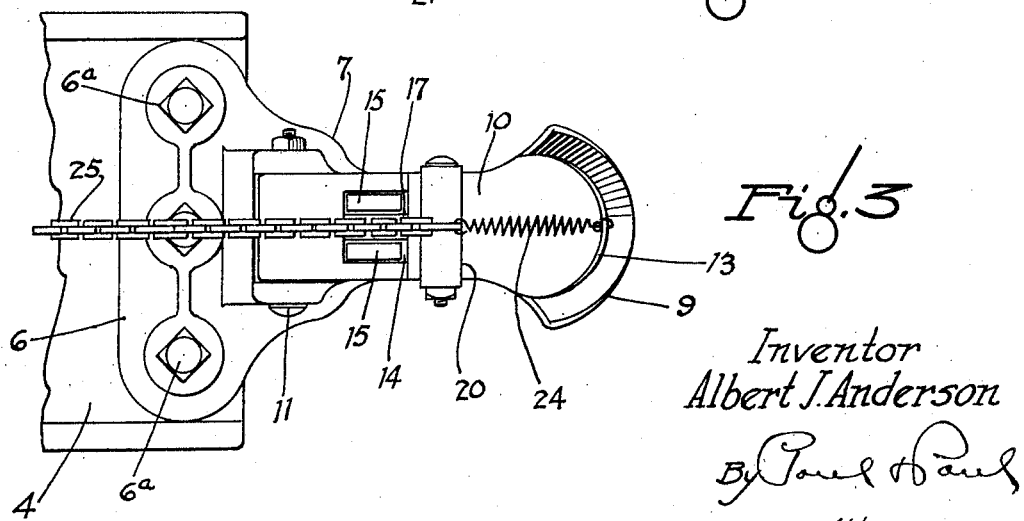

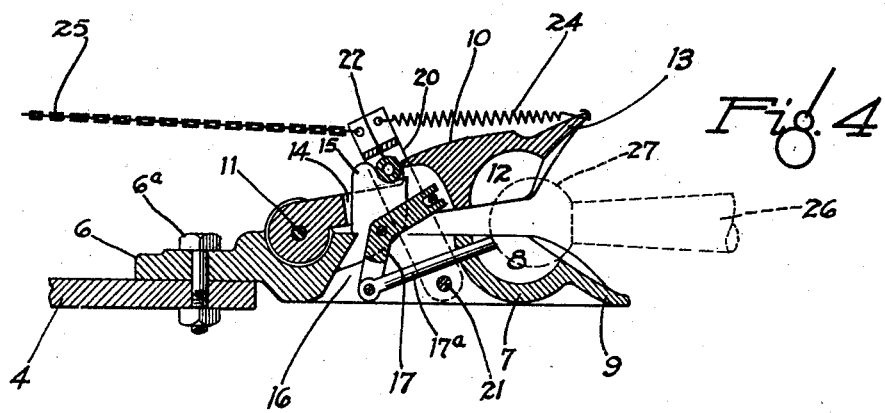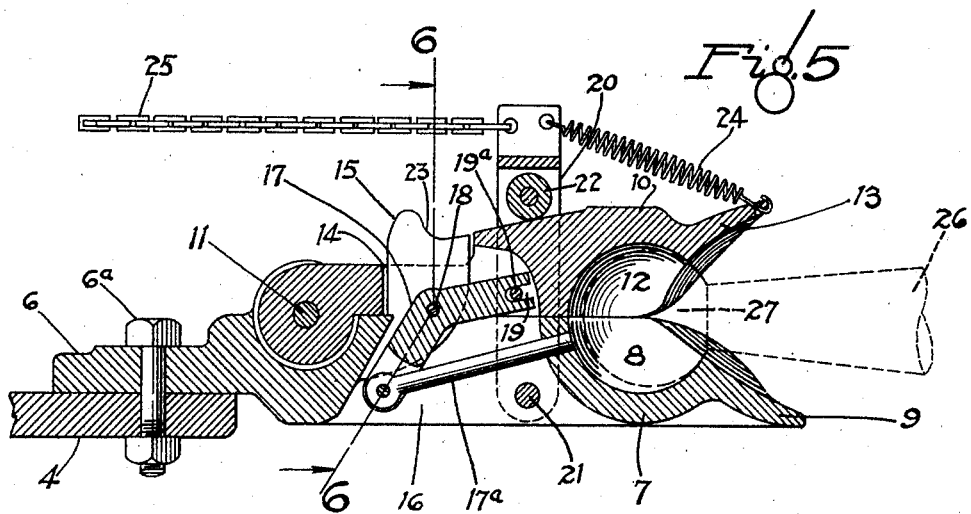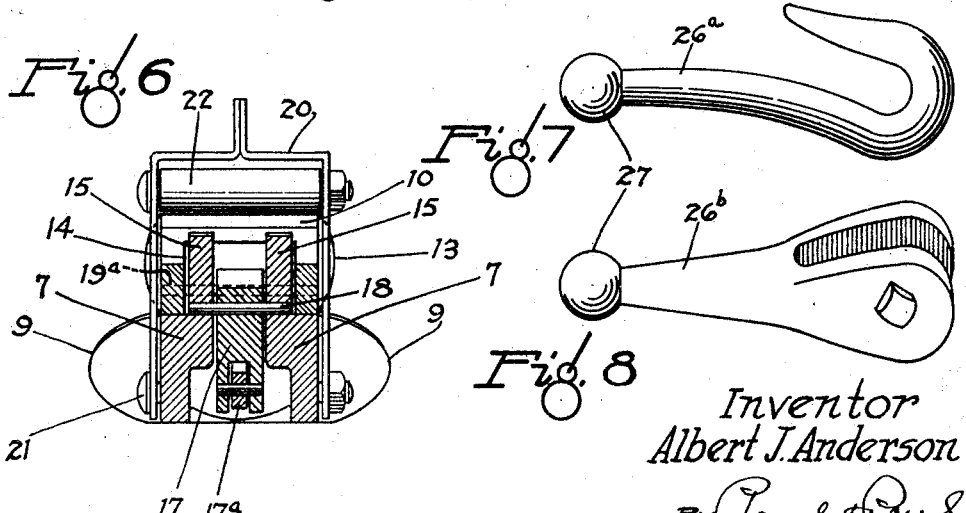

ALBERT J. ANDERSON, OF LA CROSSE, WISCONSIN.

TRACTOR-COUPLING.

1,400,402.  Specification of Letters Patent. Patented Dec. 13, 1921.

Application filed January 28, 1921. Serial No. 440,685.

*To all whom it may concern:*

Be it known that I, ALBERT J. ANDERSON, a citizen of the United States, residing at La Crosse, county of La Crosse, State of Wisconsin, have invented certain new and useful Improvements in Tractor-Couplings, of which the following is a specification.

The object of my invention is to provide a coupling device by means of which a trailer, wagon, or a ground-working implement can be easily and quickly attached to the tractor without the necessity of the driver of the machine leaving his seat.

A further object is to provide a coupling attachment to release the trailer, wagon or implement connected therewith through the operation of a trip line extending to a convenient point on the tractor.

A further object is to provide an improved means for connecting the coupler attachment to a trailer or wagon pole.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation of the rear portion of a traction machine with one wheel removed, showing my invention applied thereto, Fig. 2 is a side view of the coupler device in its locked position, Fig. 3 is a plan view of the draft connection of the tractor, showing my coupler mounted thereon, Fig. 4 is a longitudinal sectional view through the coupler, Fig. 5 is a similar view, showing the jaws closed, Fig. 6 is a transverse sectional view on the section line 6—6 of Fig. 5.

Fig. 7 is a detail view, showing a modified form of the draft shank,

Fig. 8 is a detail view of another modification of the draft shank.

In the drawing, 2 represents the frame of a traction machine, having supporting wheels 3 and a draft connection 4 mounted on the rear of the frame beneath the driver's seat 5. 6 is a plate adapted to fit on the draft connection 4 and provided with bolts $6^a$ which pass through holes in the draft connection and the plate for securing them rigidly together. The rear portion of the plate 6 has a fixed jaw 7 formed thereon. A socket 8, semi-spherical in form, is provided in the fixed jaw and a lip 9 projects forwardly and downwardly from said recess and is curved to direct the draft connection contacting therewith into the spherical recess. The lip 9 is preferably fan shaped, projecting laterally on each side of the jaw so that the connection will be guided into its seat in the coupler even though the trailer wagon or ground-working implement may be standing at an angle to the tractor instead of directly in the rear thereof.

10 represents a movable jaw pivoted at 11 on the fixed jaw and having a recess 12 therein adapted to register with the recess 8 and form a spherical recess in the coupler when the jaws are closed. An upwardly and outwardly projecting lip 13 coöperates with the lip 9 to guide the draft connection into the space between the jaws. The movable jaw has an opening 14 therein and standards 15 are mounted on the fixed jaw and project upwardly through said opening. Beneath these standards the fixed jaw has an opening 16 and a lever 17 is pivoted at a point intermediate to its ends on a pin 18 that is mounted in the base of the standards 15. The lever 17 is in the form of an elbow and has a lower end depending into the opening 16 and provided with a rod $17^a$ that is slidably mounted in the wall of the recess 8 in position to be engaged and moved longitudinally by the pressure of the draft connection when it enters the coupler. The upper end of the lever 17 has a notch 19 therein and the movable jaw is provided with a pin $19^a$ that is straddled by the arms of the notch 19 so that the lever may slide on said pin and when rocked on its support 18 will operate the movable jaw moving it from the position shown in Fig. 4 to the closed or full line positions shown in Figs. 1 and 2. A yoke 20 has arms straddling the jaws and pivoted on the lower jaw at 21. A roller 22 is mounted in the upper portion of the yoke and is adapted to ride on the top of the movable jaw and enter a seat 23 provided on the upper ends of the standards 15. The upper surface of the movable jaw is inclined, as shown in the sectional views, to engage the roller 22 and cause a downward pressure to be exerted on the movable jaw when the yoke is moved to its holding or closing position. An extension spring 24 connects the upper end of the yoke with the forward portion of the movable jaw and a trip line 25 is also attached to said yoke and extends upwardly and backwardly to a point near the driver's seat to be operated by the foot or hand of the driver, as preferred.

When the trip line is operated, the yoke is swung forward from the position shown in Fig. 5 into contact with the seat at the upper end of the standards 15. During this movement the spring 24 will be put under tension and the roller 22 will drop down upon the seat of the standards 15 to a point sufficiently below the heel of the movable jaw to prevent the tension of the spring from returning the yoke to its holding position when the trip line is released. The position of the parts when the jaws are open is plainly shown in Fig. 4, the lever being indicated in its release position below the heel of the movable jaw and the spring 24 put under tension. The movable jaw will remain in this position until it is pulled down by pressure of the rod 17$^a$ and when this occurs, the lever 17 will be rocked and the jaw moved on its pivot until the holding yoke is released, when the spring 24 will cause the yoke to ride up on the inclined surface of the movable jaw and becoming wedged thereon, hold the jaw in its closed position against accidental opening, resulting from pull on the draft connection. This draft connection or the other part of the coupler comprises the shank 26 having a bell or sphere 27 on its forward end that is adapted to enter between the fixed and movable jaws, engage the rod 17$^a$ and trip the upper jaw to automatically close the coupler and lock the shank head therein, allowing it, however, to rock freely from side to side and adjust itself to the different positions of the trailer wagon or implement that is attached to the tractor.

The rear portion of the shank 26 has a bar 26$^a$ thereon and the pole 28 has a plate 29 that is secured to the bar by suitable means, such as bolts 30. A U-bolt 31 is mounted in the forward portion of the pole and has one arm passing down through the plate 29 and the extension 26$^a$ and the pole and the other end secured in front of the pole in the rear portion of the shank 26. I am thus able to rigidly secure the shank and pole together and make the U-bolt serve as a means for clamping the plates to the pole and also for holding the shank rigidly against the end of the pole.

The head of the shank may be mounted on a hook device 26$^a$, as shown in Fig. 7, or on a clevis 26$^b$, as shown in Fig. 8, these different attachments adapting the coupler for different kinds of work, it being capable of use with either a trailer, wagon or various kinds of ground-working implements, as desired.

The lips of the jaws are so arranged that the head of the draft shank will slide into the socket without the necessity of being directed therein by hand, assuming, of course, that the draft shank is substantially on a level with the coupler when it is desired to make connection with the tractor. As the head of the shank enters the socket, it contacts with the trip rod and the lever 17 is rocked to pull the movable jaw to its closed position. This movement of the jaw releases the holding yoke and the spring 24 swings this yoke to the position shown in Fig. 5, where it will rest firmly on the top of the movable jaw and hold it securely in its closed position. The draft head fits loosely in the socket so that it may rock from side to side and rise and fall with the swaying of the trailer or vehicle or implement with which the tractor may be connected.

The device may, of course, be made in different sizes to adapt it for different classes of work.

I claim as my invention:

1. A coupling device comprising fixed and movable jaws having a socket to receive the head of a draft shank, a yoke pivoted on said fixed jaw and having a surface to ride on said movable jaw and hold it in its closed position, a trip line connected with said yoke, a spring connecting said yoke with said movable jaw and put under tension and opening said movable jaw when said yoke is moved to its release position, and means actuated by the entrance of a draft shank into said socket for closing said movable jaw and allowing said spring to return said yoke to its holding position.

2. A coupling device comprising fixed and movable jaws having a socket between them to receive the head of a draft shank, a yoke pivoted on said fixed jaw and having a surface to engage said movable jaw, a spring connecting said movable jaw with said yoke for normally holding it in its closed position, a trip line connected with said yoke for moving it to its release position against the tension of said spring, a lever actuated by the entrance of said draft shank into said socket for moving said movable jaw to allow said spring to return said yoke to its holding position.

3. A coupling device comprising fixed and movable jaws having a socket between them to receive the shank of a draft bar, a lever pivoted in said fixed jaw and having a direct pivotal connection with said movable jaw to positively close it, and means projecting into said socket and actuated by a shank entering therein for operating said lever.

4. A coupling device comprising fixed and movable jaws having means for mounting them on the rear of a tractor and provided with a socket to receive the head of a draft shank, a yoke pivoted on said fixed jaw and provided with an anti-friction roller, said movable jaw having an inclined surface to receive said roller and allow said yoke to ride thereon, a spring connecting said yoke with said movable jaw and normally holding said yoke and anti-friction roller in engagement with said inclined surface, a lever mounted in said fixed jaw and having a pivotal connection with said movable jaw and a pin mounted on said lever and projecting into said socket and actuated by said draft shank for rocking said lever and positively closing said movable jaw.

5. A coupling device comprising a fixed and movable jaw having means for mounting them on the rear of a tractor and provided with a socket to receive the head of a draft shank, a yoke pivoted on said fixed jaw and having a surface to ride on said movable jaw and normally hold it in its closed position, a spring normally tending to hold said yoke in engagement with said movable jaw, a lever pivoted at a point intermediate to its ends in said fixed jaw and provided with a pin at one end to project into said socket in the path of said draft shank, the other end of said lever having a recess therein and a pin mounted in said movable jaw to enter said recess and move said jaw to its closed position when said lever is actuated by the engagement of said shank with said pin.

6. A coupling device comprising fixed and movable jaws provided with a socket to receive the head of a draft shank, said movable jaw having an inclined upper surface, a yoke having arms to straddle said jaws and pivoted on said fixed jaw and having an anti-friction surface to ride on the inclined surface of said movable jaw, a spring connecting the upper portion of said yoke with the forward portion of said movable jaw and normally tending to hold said anti-friction surface in engagement with said inclined surface, a trip line connected with said yoke for moving it to a released position against the tension of said spring, a lever pivoted in said fixed jaw and having means projecting into said socket to be actuated by the entrance of said shank therein, said lever having means for connecting with said movable jaw for positively moving it to its closed position and allowing said yoke to ride on said inclined surface.

7. A coupling device comprising fixed and movable jaws having means for mounting them on the rear of a tractor and provided with a socket to receive the head of a draft shank, said movable jaw having an inclined upper surface and a recess in the rear of said surface, a yoke pivoted on said fixed jaw and having an anti-friction roller to ride on said inclined surface and drop into said recess in the rear of said surface, a spring connecting said movable jaw with said yoke, the wall of said recess engaging said anti-friction roller and holding said yoke in its released position against the tension of said spring, a lever pivoted in said movable jaw and having means projecting into said socket to be actuated by the entrance of said shank therein for actuating said lever, said lever having a pivotal connection with said movable jaw to impart an initial movement thereto and disengage said wall from said antifriction roller and allow said spring to move said yoke and roller upon said inclined surfaces and lock said movable jaw.

In witness whereof, I have hereunto set my hand this 18th day of January, 1921.

ALBERT J. ANDERSON.